United States Patent
Masaki et al.

(10) Patent No.: US 6,751,476 B2
(45) Date of Patent: Jun. 15, 2004

(54) INFORMATION PROCESSING APPARATUS, WIRELESS COMMUNICATION CARD, AND INFORMATION PROCESSING SYSTEM

(75) Inventors: Toshiyuki Masaki, Fukaya (JP); Kenji Hibi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/279,915

(22) Filed: Oct. 25, 2002

(65) Prior Publication Data

US 2003/0060233 A1 Mar. 27, 2003

Related U.S. Application Data

(63) Continuation of application No. PCT/JP01/01709, filed on Mar. 6, 2001.

(30) Foreign Application Priority Data

Apr. 28, 2000 (JP) ........................................ 2000-131779

(51) Int. Cl.⁷ .............................. H04B 1/38; H04M 1/00
(52) U.S. Cl. ................. 455/558; 455/556.1; 455/556.2; 455/557; 455/97; 343/702; 343/828
(58) Field of Search .............................. 455/558, 556.1, 455/556.2, 557, 550.1, 97, 90; 343/702, 828

(56) References Cited

U.S. PATENT DOCUMENTS

| | | | |
|---|---|---|---|
| 5,684,672 A | * 11/1997 | Karidis et al. | 361/683 |
| 5,867,131 A | * 2/1999 | Camp et al. | 343/797 |
| 5,905,947 A | * 5/1999 | Stein | 455/90.3 |
| 5,913,174 A | * 6/1999 | Casarez et al. | 455/557 |
| 6,172,645 B1 | * 1/2001 | Hollander et al. | 343/702 |
| 6,181,284 B1 | * 1/2001 | Madsen et al. | 343/702 |
| 6,217,351 B1 | * 4/2001 | Fung et al. | 439/131 |
| 6,240,302 B1 | * 5/2001 | Harrison | 455/556.1 |
| 6,259,409 B1 | * 7/2001 | Fulton et al. | 343/702 |
| 6,266,017 B1 | * 7/2001 | Aldous | 343/702 |
| 6,400,931 B1 | * 6/2002 | Inkinen et al. | 455/90.1 |

FOREIGN PATENT DOCUMENTS

| | | |
|---|---|---|
| EP | 0 791 878 A2 | 8/1997 |
| JP | 10-163733 | 6/1998 |
| JP | 10-322355 | 12/1998 |
| JP | 11-261274 | 9/1999 |
| JP | 2000-075972 | 3/2000 |
| WO | WO 96/39752 | 12/1996 |

OTHER PUBLICATIONS

Masaki, T. et al., "An Antenna Arrangement of an Information Processor", U.S. application No. 09/456,986, filed Dec. 7, 1999.

Masaki, T., "Radio Communication Device and Electronic Apparatus Having The Same", U.S. application No. 09/730,554, filed on Dec. 7, 2000.

* cited by examiner

Primary Examiner—Marceau Milord
(74) Attorney, Agent, or Firm—Finnegan, Henderson, Farabow, Garrett & Dunner, L.L.P.

(57) ABSTRACT

An information processing apparatus utilizes a function of a wireless communication card including a control section and a wireless communication section. The apparatus includes a body, and an antenna supported by the apparatus main body. A slot is provided to the body and configured to detachably insert the card therein. A first connector is provided to the apparatus main body, and configured to connect the control section to the body when the card is inserted in the slot. A second connector is provided to the body, and configured to connect the wireless communication section to the antenna in a state where the card is inserted the slot.

17 Claims, 4 Drawing Sheets

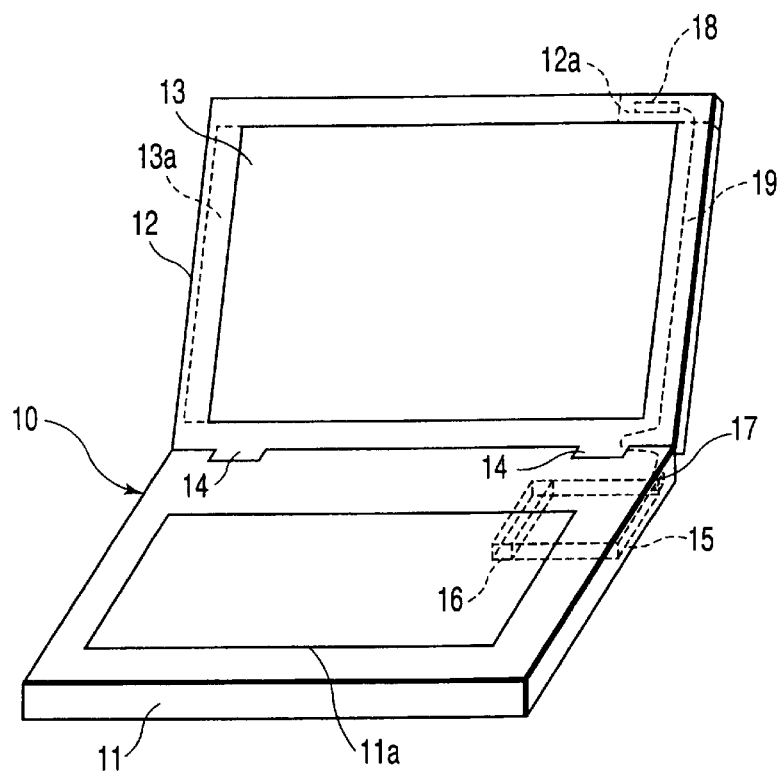
FIG. 1
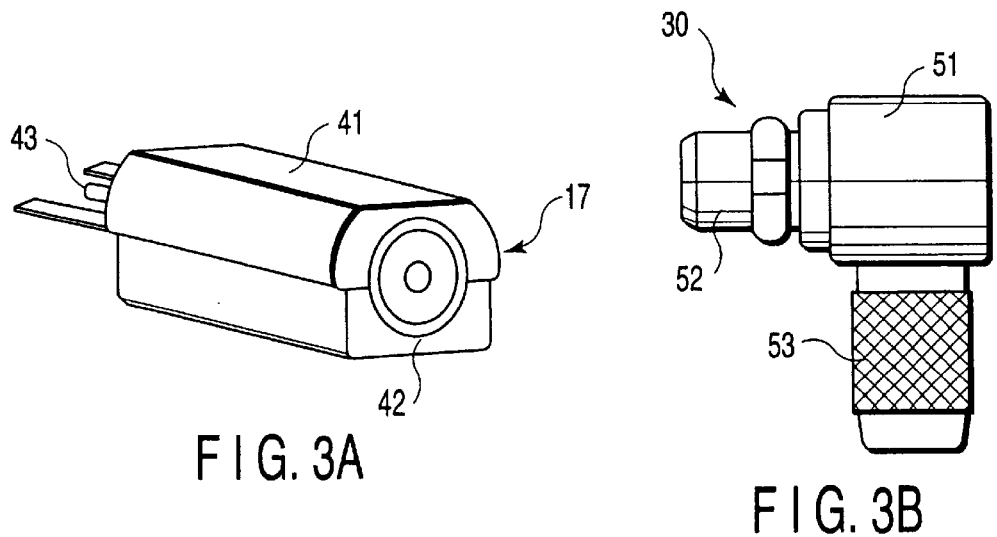
FIG. 3A
FIG. 3B

INFORMATION PROCESSING APPARATUS, WIRELESS COMMUNICATION CARD, AND INFORMATION PROCESSING SYSTEM

CROSS-REFERENCE TO RELATED APPLICATIONS

This is a Continuation Application of PCT Application No. PCT/JP01/01709, filed Mar. 6, 2001, which was not published under PCT Article 21(2) in English.

This application is based upon and claims the benefit of priority from the prior Japanese Patent Application No. 2000-131779, filed Apr. 28, 2000, the entire contents of which are incorporated herein by reference.

BACKGROUND OF THE INVENTION

1. Field of the Invention

The present invention relates to a technique for performing wireless communication by an information processing apparatus in cooperation with a wireless communication card inserted into a card slot thereof.

2. Description of the Related Art

Where wireless communication is performed in a portable information processing apparatus, such as a notebook personal computer (PC), an information-processing peripheral device, which has a wireless communication function and a card shape (a wireless communication card), is inserted into a card slot formed in the PC, so that wireless communication is performed by the card. For example, Jpn. Pat. Appln. KOKAI Publication No. 11-261274 (a card type circuit apparatus) discloses a conventional wireless communication card (a PC card in accordance with, e.g., PC Card standard) with a wireless communication function. The PC card disclosed in this publication includes a wireless communication circuit and an antenna mounted thereon, such that, when it is inserted in the PC card slot of a notebook PC, the antenna portion extends out of the main body. As a PC card with a wireless communication function, there is a card of a communication type, such as wireless LAN, or Bluetooth.

Bluetooth is a standard for short distance wireless communication, which uses an ISM (Industry Science Medical) band of a 2.4 GHz band to realize wireless communication at a distance of 10 m or less. Bluetooth utilizes a frequency hopping method as a spectrum diffusion technique, and allows at most eight devices to be connected by a time division multiplexing method. In Bluetooth, a network called "pico-net" is formed of devices connected by a time division multiplexing method, in which one of them functions as a host device and the others function as slave devices. This network (pico-net) uses PIN (Personal Identification Number) codes to perform connection authentication.

As described above, notebook PCs perform wireless communication with the outside through the antenna of a PC card for wireless communication inserted into a PC card slot. In general, however, notebook PCs have a PC card slot formed in the base unit of a PC main body, and thus the antenna portion of a PC card inserted in the slot is positioned close to a table. Where the antenna of a PC card for wireless communication is positioned close to a table, it is greatly affected by the table, which deteriorates the performance.

FIGS. 6A and 6B are views showing characteristic of horizontal polarized waves and vertical polarized waves, respectively, where an antenna radiation pattern was measured while a PC card for wireless communication was inserted into the PC card slot of a notebook PC, which was placed on a corrugated cardboard box made of paper. The measurement on the corrugated cardboard box is equivalent to that in a floating state in the air, thereby providing a good characteristic in the horizontal polarized waves.

FIGS. 7A and 7B are views showing characteristic of horizontal polarized waves and vertical polarized waves, respectively, where an antenna radiation pattern was measured while the PC card for wireless communication was inserted into the PC card slot of the notebook PC, which was placed on a table made of wood. As shown by the characteristics in FIGS. 7A and 7B, the antenna radiation characteristics measured on the table made of wood are greatly deteriorated. Especially, where a table is made of metal, the antenna radiation characteristics are further deteriorated, with a decrease of 5 to 6 dB in the antenna gain.

Furthermore, where an antenna is placed at a low position, it is easily affected by the environment, such that, e.g., transmission/reception radio waves are interrupted during operation of a PC. In addition, where part of the PC card projects from the main body, if a notebook PC is dropped during carriage, a PC card for wireless communication can be easily broken.

BRIEF SUMMARY OF THE INVENTION

An object of an embodiment is to provide an information processing apparatus, wireless communication card, and information processing system, which can reliably prevent a card from being damaged, or the like, during carriage.

According to a first aspect of the present invention, there is provided an information processing apparatus, which utilizes a function of a wireless communication card including a control section and a wireless communication section, the apparatus comprising:

a body;

an antenna supported by the body;

a slot provided to the body and configured to detachably insert the card therein;

a first connector provided to the body, and configured to connect the control section to the body when the card is inserted in the slot; and a second connector provided to the body, and configured to connect the wireless communication section to the antenna in a state where the card is inserted in the slot.

According to a second aspect of the present invention, there is provided a wireless communication card to be detachably inserted in a slot formed in an information processing apparatus having a wireless communication antenna, the card comprising:

a card casing;

a circuit provided in the card casing, and including a control section and a wireless communication section connected to the control section;

a first connector provided to the card casing, and electrically connecting the control section to the information processing apparatus when the card is inserted in the slot; and a second connector provided to the card casing, and electrically connecting the wireless communication section to the antenna.

According to a third aspect of the present invention, there is provided an information processing system comprising:

an information processing apparatus comprising an apparatus main body having an information processing function, and a wireless communication antenna supported by the apparatus main body; and a wireless communication card comprising a circuit including a control section and a wireless communication section connected to the control section, wherein the information processing apparatus comprises
a slot formed in the apparatus main body and configured to detachably insert the card therein,
a first connector provided to the apparatus main body, and configured to interface-connect the control section to the apparatus main body in a state where the card is inserted in the slot, and
a second connector provided to the apparatus main body, and configured to connect the wireless communication section to the antenna in the state where the card is inserted in the slot, and wherein the wireless communication card comprises
a card casing forming a card shape and containing the circuit,
a third connector provided to the card casing, and configured to engage with the first connector and interface-connect the control section to the information processing apparatus in the state where the card is inserted in the slot, and
a fourth connector provided to the card casing, and configured to engage with the second connector and connect the wireless communication section to the antenna in the state where the card is inserted in the slot.

BRIEF DESCRIPTION OF THE SEVERAL VIEWS OF THE DRAWING

FIG. 1 is a perspective view showing a PC main body used in an information processing system according to a first embodiment of the present invention;

FIGS. 3A and 3B are a perspective view showing a coaxial connector (on the jack side) provided to a base unit, and a side view showing a coaxial connector (on the plug side) provided to the PC card, respectively, according to the first embodiment;

DETAILED DESCRIPTION OF THE INVENTION

Figure 2:
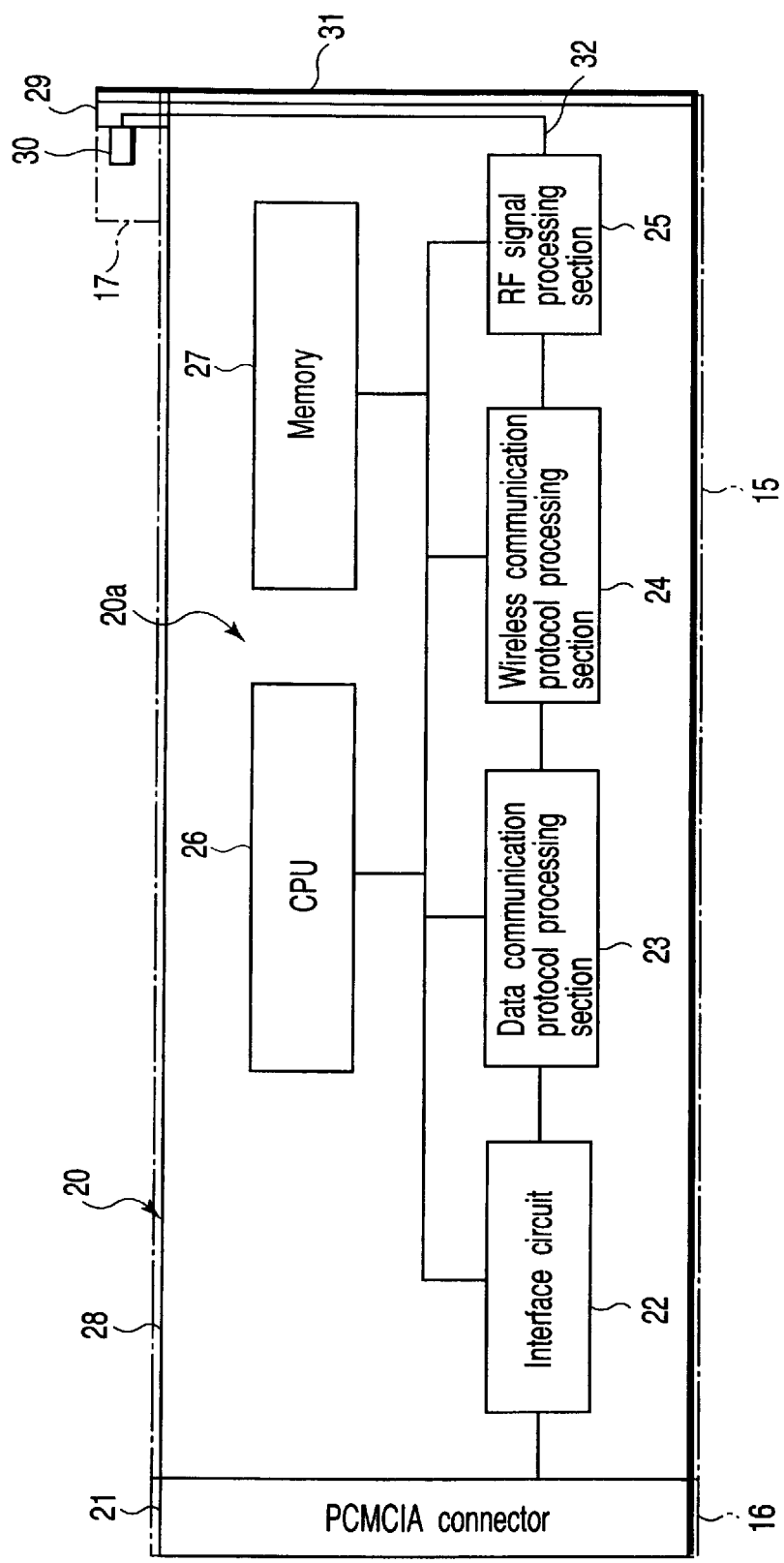
FIG. 2 is a view showing a PC card used in the information processing system according to the first embodiment.

Embodiments of the present invention will be described hereinafter with reference to the accompanying drawings. In the following description, the constituent elements having substantially the same function and arrangement are denoted by the same reference numerals, and a repetitive description will be made only when necessary.

First Embodiment

FIG. 1 is a perspective view showing a PC main body 10 of a portable information processing apparatus, such as a notebook personal computer (PC), used in an information processing system according to a first embodiment of the present invention. The PC main body 10 includes a base unit 11, and a panel unit or lid body 12 rotatably supported on the rear side of the base unit 11 by a hinge 14. The base unit 11 is provided with a keyboard (a key-input section) 11a on the top side, and with a circuit board constituting a data processing section and so forth inside the unit 11. The lid body 12 has a display, such as a liquid crystal display 13, on the inner side.

The base unit 11 has a card slot, such as a PC card slot 15, at a position close to the hinge 14, on one side, such as the right side. A connector 16 prepared in accordance with PCMCIA (Personal Computer Memory Card International Association) is disposed at the innermost portion, i.e., the bottom, of the PC card slot 15. In addition, a coaxial connector (on the jack side) 17, such as MMCX (Micro Mate TM CoaXial), is disposed adjacent to the PC card slot 15 on the base unit 11.

The PC card slot 15 is arranged to allow a PC card (an information-processing peripheral device, which has a card shape), other than a PC card 20 described later for wireless communication, to be detachably inserted, as long as the PC card accords with the PC Card standard. In this case, the PC card is interface-connected to the PC main body 10 by the connector 16.

The panel unit or lid body 12 is provided with a wireless communication antenna 18 at a position above the liquid crystal display 13, the antenna 18 being connected to the coaxial connector 17 by a coaxial cable 19. The wireless communication antenna 18 is provided to the side where the PC card slot 15 is formed, so that the length of the coaxial cable 19 is reduced as far as possible. Furthermore, the PC card slot 15 is disposed at a position close to the hinge 14. Where the antenna 18 and the PC card slot 15 are specifically positioned, and the coaxial cable 19 is shortened to the least, as described above, it is possible to reduce the influence of noise on signals transmitted/received through the coaxial cable 19.

The wireless communication antenna 18 and the coaxial cable 19 are separate from the edge of the liquid crystal display 13 by a distance of 3 mm or more. The driving circuits 13a of the liquid crystal display 13 are provided together on a side opposite to the side where the antenna 18 and the coaxial cable 19 are disposed. The wireless communication antenna 18 is hidden in the panel unit or lid body 12 in an invisible state, and is covered with a non-metal material member 12a. With these arrangements, it is possible to reduce the influence of noise on signals transmitted/received through the antenna 18 and the coaxial cable 19.

Where the whole lid body 12 is formed of a non-metal material frame, its inner surface is covered with a metal coating, in general. In this case, however, part of the metal coating on the lid body 12 is omitted at a position corresponding to the antenna 18, in order to provide, a non-metal material member 12a. Instead of this arrangement, where the whole lid body 12 is formed of a metal material frame, part of the frame is cut out at a position corresponding to the antenna 18, and a non-metal material member 12a is fitted therein.

FIG. 2 is a view showing a wireless communication card, such as a PC card 20 having a wireless communication function, used in the information processing system according to the first embodiment. The PC card 20 includes a card casing 28 forming a card shape, and an internal circuit 20a formed of a circuit board provided in the card casing 28. A connector 21 prepared in accordance with PCMCIA is disposed at the distal end of the card casing 28, i.e., the front end in a direction in which the PC card 20 is inserted into the PC card slot 15 of the PC main body 10.

The internal circuit 20a includes an interface circuit 22, a data communication protocol processing section 23, a wireless communication protocol processing section 24, an RF (Radio Frequency) signal processing section 25, CPU 26, and a memory 27, which are connected to each other through an internal bus. Specifically, the CPU 26 is connected to the interface circuit 22, the data communication protocol processing section 23, the wireless communication protocol processing section 24, and the RF signal processing section 25, while the interface circuit 22 is connected to the PCMCIA connector 21.

The CPU 26 performs control operations for the entire circuit. The data communication protocol processing section 23 performs base band processing. The wireless communication protocol processing section 24 performs primary modulation processing and secondary modulation processing, and, for example, in the case of Bluetooth, it performs processes, such as GFSK (Gaussian Frequency Shift Keying) and frequency hopping. The RF signal processing section 25 performs processing for RF signals, such as transmission/reception and amplifying.

A coaxial connector (on the plug side) 30, such as MMCX, is provided to a lateral side of the proximal portion of the card casing 28. The proximal portion of the card casing 28 is provided with a reinforcement 31 attached thereto, which has on one side a projecting portion 29 extending in a direction perpendicular to the longitudinal direction of the card casing 28 (the card insertion direction). The plug connector 30 is provided to extend from the projecting portion 29 toward the distal end of the card casing 28 in parallel with the card insertion direction. The coaxial connector 30 is connected to the RF signal processing section 25 through a signal line 32, such as a micro-strip-line.

Accordingly, the coaxial connector 30 is disposed at a position corresponding to the coaxial connector 17 shown in FIG. 1, so that it is connected to the coaxial connector 17 of the PC main body 10 by an operation of inserting the PC card 20 into the PC card slot 15 of the PC main body 10. In other words, when the PC card 20 is inserted into the PC card slot 15 to join the PCMCIA connector 21 with the PCMCIA connector 16, the coaxial connector 30 is also joined with the coaxial connector 17.

Accordingly, when the PC card 20 is inserted into the PC card slot 15, the RF signal processing section 25 is connected to the antenna 18 through the coaxial connectors 30 and 17, and the coaxial cable 19, so that transmission/reception processes with an external device can be performed through the antenna 18. Since the antenna 18 is disposed above the liquid crystal display 13 of the PC main body 10, it is not affected by a table or the like on which the PC main body 10 is placed, thereby favorably performing communication with an external device.

FIG. 3A shows a structural example of the MMCX coaxial connector (on the jack side) 17 provided to the base unit 11. In the coaxial connector 17 on the jack side, a jack 42 is provided to the front end of a casing 41, and a connection terminal 43 is provided to the rear end of the casing 41. FIG. 3B shows a structural example of the MMCX coaxial connector (on the plug side) 30 provided to the PC card 20. In the coaxial connector 30 on the plug side, a plug 52 is provided to the front end of a casing 51, and a connecting portion 53 is provided to the bottom end of the casing 41. The coaxial connectors 17 and 30 are joined to each other, when the plug 52 of the coaxial connector 30 shown in FIG. 3B is inserted into the jack 42 of the coaxial connector 17 shown in FIG. 3A.

Figure 4A:
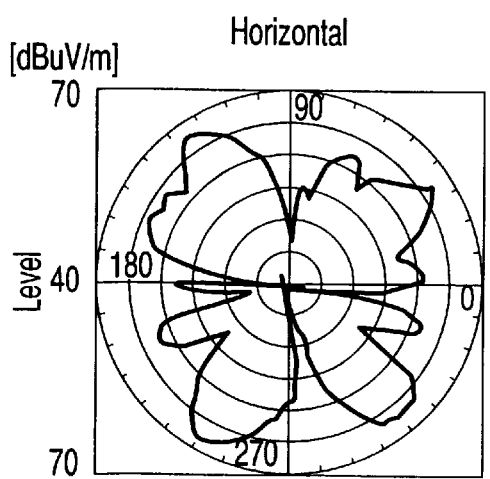
FIGS. 4A and 4B are views showing horizontal polarized waves and vertical polarized waves, respectively, where an antenna radiation characteristic of the system according to the first embodiment was measured on a table made of wood.
Figure 4B:
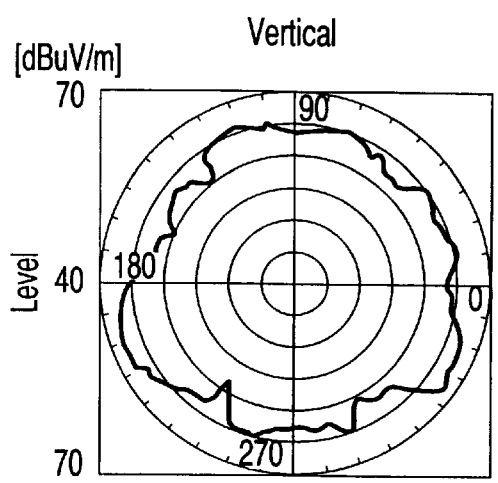

FIGS. 4A and 4B are views showing characteristic of horizontal polarized waves and vertical polarized waves, respectively, where an antenna radiation pattern was measured while the PC card 20 was inserted into the PC card slot 15 of the PC main body 10, which was placed on a table made of wood. According to this embodiment, as is obvious from the antenna radiation characteristics shown in FIGS. 4A and 4B, both the horizontal polarized waves and vertical polarized waves assume good characteristics, while being hardly affected by the table. It was also confirmed that, even where the PC main body 10 was placed on a table made of metal, antenna radiation characteristics the same as those on the table made of wood were obtained.

According to the present invention, since the antenna is not mounted on the PC card 20, it is hardly affected by a table, thereby providing good antenna radiation characteristics. In addition, unlike the conventional cases, since the antenna portion of a PC card does not project from the base unit 11, the PC card is less likely to break if it is dropped at the worst during carriage.

It suffices that only PC cards 20 are exchanged to conform to various kinds of wireless communication, so long as these kinds of wireless communication are performed, using the same frequency band. For example, at present, since the same frequency band range of from 2.4 GHz to 2.835 GHz is used for wireless LAN and Bluetooth, the same antenna 18 can be used for both of them.

Furthermore, since the structure of the PC card slot 15 is the same as conventional ones, an ordinary PC card having no wireless communication function can be also used.

Second Embodiment

Figure 5:
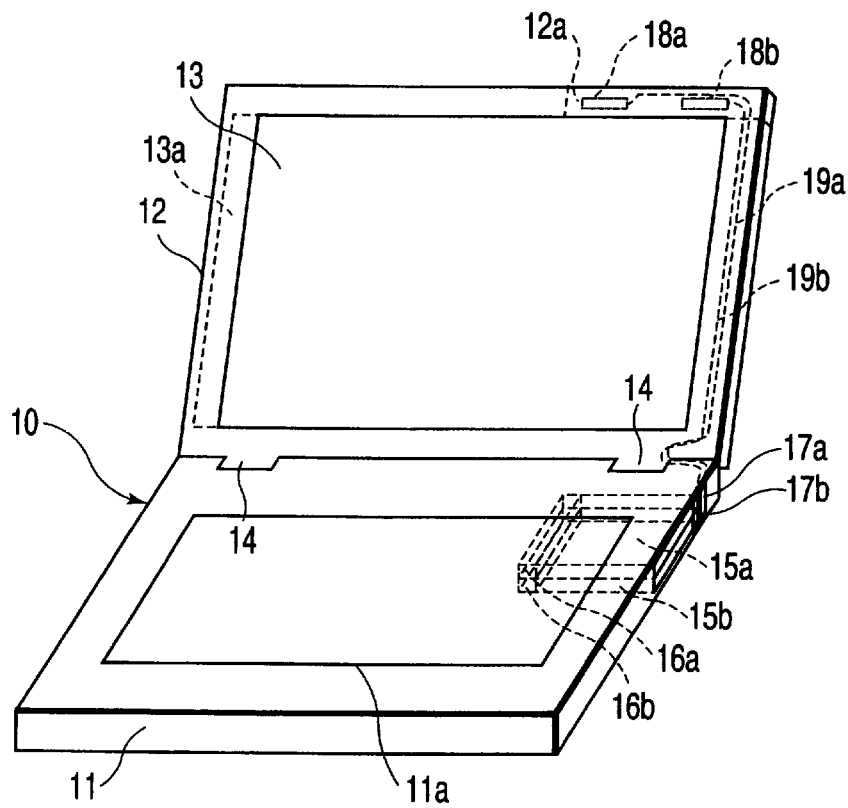
FIG. 5 is a perspective view showing a PC main body used in an information processing system according to the second embodiment of the present invention.
Figure 6A:
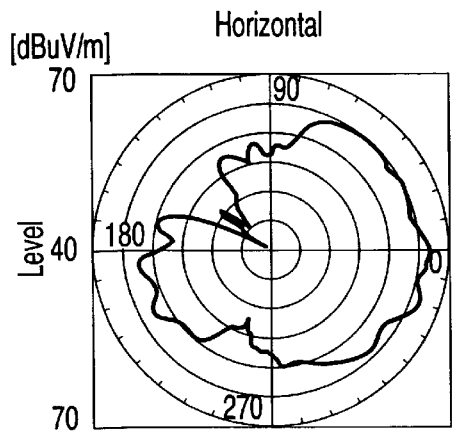
FIGS. 6A and 6B are views showing horizontal polarized waves and vertical polarized waves, respectively, where an antenna radiation characteristic of a PC card for wireless communication was measured on a corrugated cardboard box made of paper.
Figure 6B:
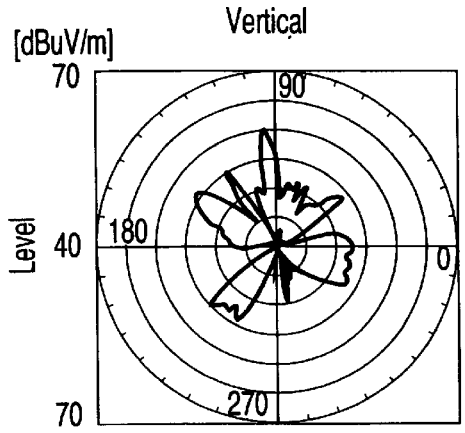
Figure 7A:
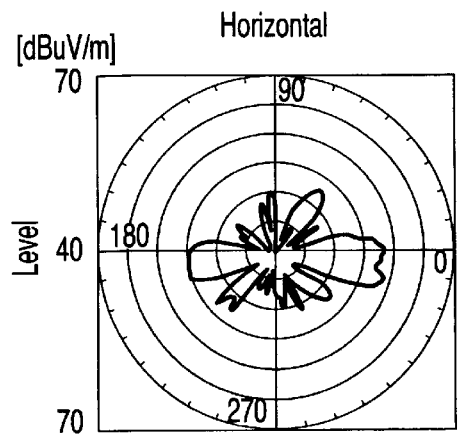
FIGS. 7A and 7B are views showing horizontal polarized waves and vertical polarized waves, respectively, where an antenna radiation characteristic of a PC card for wireless communication was measured on a table made of wood.
Figure 7B:
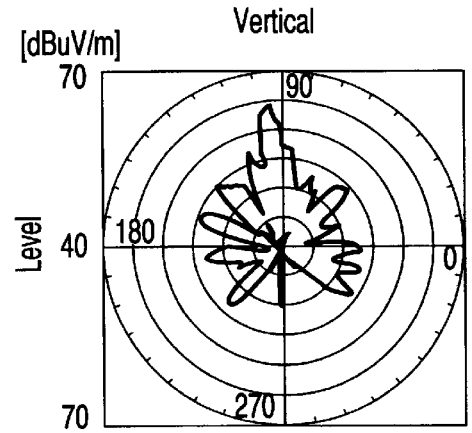

FIG. 5 is a perspective view showing a PC main body 10 used in an information processing system according to the second embodiment of the present invention. The second embodiment differs from the first embodiment in that the notebook PC is provided with a plurality of PC card slots.

As shown in FIG. 5, the PC main body 10 according to the second embodiment has a first PC card slot 15a and a second PC card slot 15b provided toe above the other, at one side, such as the right side, of the base unit 11. PCMCIA connectors 16a and 16b are respectively disposed at the innermost portions, i.e., the bottoms, of the first PC card slot 15a and the second PC card slot 15b. In addition, a first coaxial connector 17a and a second coaxial connector 17b are respectively disposed adjacent to the PC card slots 15a and 15b on the base unit 11.

A lid body 12 is provided with a first antenna 18a and a second antenna 18b both for wireless communication, at positions with a certain distance therebetween, above the liquid crystal display 13. The first antenna 18a and the second antenna 18b are connected to the first coaxial connector 17a and the second coaxial connector 17b by coaxial cables 19a and 19b, respectively.

Since the PC main body 10 has the first PC card slot 15a and the second PC card slot 15b, as described above, a PC card 20 for wireless communication 20 shown in FIG. 2 can be inserted and used in either of them. In either case, antenna radiation characteristics are improved, as in the first embodiment.

In addition, since the PC main body 10 has the first PC card slot 15a and the second PC card slot 15b, it is possible to use different kinds of wireless communication at the same time. In this respect, using conventional PC cards with an antenna thereon, it is physically impossible to insert at the same time two PC cards into vertically adjacent PC card slots. In contrast, according to present invention, since the PC card 20 is provide with no antenna thereon, it is possible to insert at the same time two PC cards 20 into the first PC card slot 15*a* and the second PC card slot 15*b*, which are vertically adjacent.

Where the first antenna 18*a* and the second antenna 18*b* are built in the PC main body 10, the design is adapted to suppress characteristic deterioration due to interference of the antennas with each other, thereby allowing wireless communication functions of different frequency bands to be used. For example, it can be adapted to use a band of from 2.4 GHz to 2.4835 GHz for wireless LANs and Bluetooth, a 1.9 GHz band for PHS (Personal Handy-Phone System), and an 800 MHz band and a 1.5 GHz band for PDC (Personal Digital Cellular). In other words, the first and second antennas 18*a* and 18*b* can be designed for different transmission frequency bands.

According to the present invention, the antenna of an information processing apparatus is less affected by the environment around the apparatus, so that good radiation characteristics are obtained to improve communication conditions relative to an external device. In addition, unlike the conventional cases, a wireless communication card is provided with no antenna, and thus no antenna portion of the wireless communication card projects from the base unit, so that the card is less likely to break if it is dropped at the worst during carriage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus, which utilizes a function of a wireless communication card including a control section and a wireless communication section, the apparatus comprising:
    a base unit having a data processing function;
    a panel unit rotatably attached to the base unit by a hinge and including a display portion;
    a wireless communication antenna supported by the panel unit;
    a slot formed in the base unit near the hinge and configured to receive the card;
    a first connector disposed in the slot and configured to be joined with a third connector of the card, the first connector being joined with the third connector to interface-connect the control section of the card to the base unit when the card is inserted in the slot; and
    a second connector disposed on a lateral side of the slot facing the hinge and configured to be joined with a fourth connector of the card, the second connector being joined with the fourth connector to connect the wireless communication section of the card to the antenna in conjunction with an operation of inserting the card into the slot.

2. The apparatus according to claim 1, wherein the first connector is disposed at an innermost portion of the slot.

3. The apparatus according to claim 1, wherein the second connector comprises a coaxial connector.

4. The apparatus according to claim 3, wherein the coaxial connector comprises a jack.

5. The apparatus according to claim 1, wherein the slot accommodates the card substantially entirely.

6. The apparatus according to claim 1, wherein the wireless communication antenna is disposed on an upper portion of the panel unit.

7. The apparatus according to claim 6, wherein the wireless communication antenna is embedded in the panel unit, and covered with a non-metal material member.

8. The apparatus according to claim 6, wherein the wireless communication antenna is disposed on the panel unit, at a position close to a side where the slot is formed.

9. The apparatus according to claim 1, wherein a driving circuit for the display portion is disposed on one side of the panel unit, and a cable connecting the second connector to the wireless communication antenna is disposed on the other side opposite to the one side.

10. The apparatus according to claim 1, wherein the wireless communication antenna comprises a plurality of wireless communication antennas for transmission frequency bands different from each other, and the slot, the first connector, and the second connector respectively comprise a plurality of slots, a plurality of first connectors, and a plurality of second connectors in correspondence with a plurality of wireless communication cards to be respectively connected to the plurality of wireless communication antennas.

11. The apparatus according to claim 1, wherein wireless communication with the wireless communication antenna is performed by a wireless LAN or Bluetooth.

12. The apparatus according to claim 1, wherein the slot is configured to receive an information-processing peripheral device having a card shape, other than the wireless communication card, and the first connector is configured to interface-connect the peripheral device to the base unit when the peripheral device is inserted in the slot.

13. An information processing system comprising a wireless communication card, which includes a control section and a wireless communication section, and an information processing apparatus, which utilizes a function of the wireless communication card;
    the information processing apparatus comprising:
        a base unit having a data processing function;
        a panel unit rotatably attached to the base unit by a hinge and including a display portion;
        a wireless communication antenna supported by the panel unit;
        a slot formed in the base unit near the hinge and configured to receive the card;
        a first connector disposed in the slot and configured to be joined with a third connector of the card; and
        a second connector disposed on a lateral side of the slot facing the hinge and configured to be joined with a fourth connector of the card; and
    the wireless communication card comprising:
        a card casing forming a card shape;
        a circuit disposed in the card casing and including the control section and the wireless communication section;
        the third connector disposed on the card casing and configured to be joined with the first connector of the apparatus, the third connector being joined with the first connector to interface-connect the control section of the card to the base unit when the card is inserted in the slot; and
        the fourth connector projecting from a lateral side of the card casing and configured to be joined with the second connector of the apparatus, the fourth connector being joined with the second connector to connect the wireless communication section of the card to the antenna in conjunction with an operation of inserting the card into the slot.

14. A wireless communication card to be detachably inserted in a slot formed in an information processing apparatus, which includes a wireless communication antenna, a first connector for interface-connection disposed in the slot, and a second connector for antenna connection disposed on a lateral side of the slot, the wireless communication card comprising:

a card casing forming a card shape;

a circuit disposed in the card casing and including a control section and a wireless communication section connected to the control section;

a third connector disposed on the card casing and configured to be joined with the first connector of the apparatus, the third connector being joined with the first connector to interface-connect the control section of the card to the base unit in a state where the card is inserted in the slot; and a fourth connector projecting on a lateral side of the card casing and configured to be joined with the second connector of the apparatus, the fourth connector being joined with the second connector to connect the wireless communication section of the card to the antenna in company with an operation of inserting the card into the slot.

15. The card according to claim 14, wherein the third connector is disposed at a distal end of the card casing in a direction in which the card is inserted into the slot.

16. The card according to claim 14, wherein the fourth connector comprises a coaxial connector.

17. The card according to claim 16, wherein the coaxial connector comprises a plug.

* * * * *